(12) United States Patent
Kawano et al.

(10) Patent No.: US 6,525,879 B1
(45) Date of Patent: Feb. 25, 2003

(54) OPTICAL FILTERING APPARATUS AND METHOD

(75) Inventors: Katsunori Kawano, Nakai-machi (JP); Jiro Minabe, Nakai-machi (JP); Takehiko Niitsu, Nakai-machi (JP); Tsutomu Ishii, Nakai-machi (JP); Yasunari Nishikata, Nakai-machi (JP); Kazuo Baba, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/577,827

(22) Filed: May 25, 2000

(30) Foreign Application Priority Data

Jul. 2, 1999 (JP) .......................................... 11-189718

(51) Int. Cl.[7] .............................................. G02B 27/44
(52) U.S. Cl. ........................ 359/559; 359/558; 359/900; 349/17; 349/24
(58) Field of Search ................................ 359/559, 560, 359/561, 562, 564, 29, 558, 900; 349/24, 170, 180, 17

(56) References Cited

U.S. PATENT DOCUMENTS

| | | | | |
|---|---|---|---|---|
| 4,533,211 A | * | 8/1985 | Bjorklund et al. | 359/559 |
| 5,384,221 A | * | 1/1995 | Savant et al. | 430/19 |
| 5,617,203 A | * | 4/1997 | Kobayashi et al. | 250/550 |
| 5,841,489 A | * | 11/1998 | Yoshida et al. | 359/561 |
| 5,846,452 A | * | 12/1998 | Gibbons et al. | 349/123 |
| 5,854,710 A | * | 12/1998 | Rao et al. | 359/559 |
| 5,859,728 A | * | 1/1999 | Colin et al. | 359/561 |
| 5,872,648 A | * | 2/1999 | Sanchez et al. | 359/559 |
| 6,021,223 A | * | 2/2000 | Toyoda et al. | 359/237 |

FOREIGN PATENT DOCUMENTS

| | | |
|---|---|---|
| JP | A-4-306787 | 10/1992 |
| JP | A-7-248718 | 9/1995 |
| JP | 09-258276 A | * 10/1997 |
| JP | 2000-82213 A | * 3/2000 |

OTHER PUBLICATIONS

N. M. Burykin, et al, "Photoinduced Anisotropy in Bio–Chrom Films", Optics Comm. vol. 54, No. 2, pp. 68–70. May 15, 1985.*

S. H. Lee, *Mathematical Operations By Optical Processing*, Optical Engineering, vol. 13, No. 3, pp. 196–207, May/Jun. 1974.

Y. Sheng et al., *Optical Wavelet Matched Filters For Shift–Invariant Pattern Recognition*, Optics Letters, vol. 18, No. 4, pp. 299–301, Feb. 1993.

J. Horner et al., *Phase–Only Matched Filtering*, Applied Optics, vol. 23, No. 6, pp. 812–816, Mar. 1984.

Y. Li et al., *Coherent Optical Processing Of Gabor And Wavelet Expansions Of One– And Two–Dimensional Signals*, Optical Engineering, vol. 31, No. 9, pp. 1865–1885, Sep. 1992.

D. Mendlovic et al., *Optical Realization Of The Wavelet Transform For Two–Dimensional Objects*, Applied Optics, vol. 32, No. 32, pp. 6542–6546.

J. Widjaja et al., *Optical Wavelet–Matched Filtering By Four–Wave Mixing in Photorefractive Media*, Optics Communications, 117, pp. 123–126, (May 1995).

* cited by examiner

Primary Examiner—John Juba, Jr.
(74) Attorney, Agent, or Firm—Oliff & Berridge, PLC

(57) ABSTRACT

An optical filtering apparatus and method, wherein at least one polarizer is located in the path of radiation passing through a birefringent medium. The invention can be used to process complementary bands of spatial frequency spectra. The invention can be practiced using a polarizing beam splitter. The invention can also be practiced using an optical storage layer forming part of the birefringent medium.

15 Claims, 11 Drawing Sheets

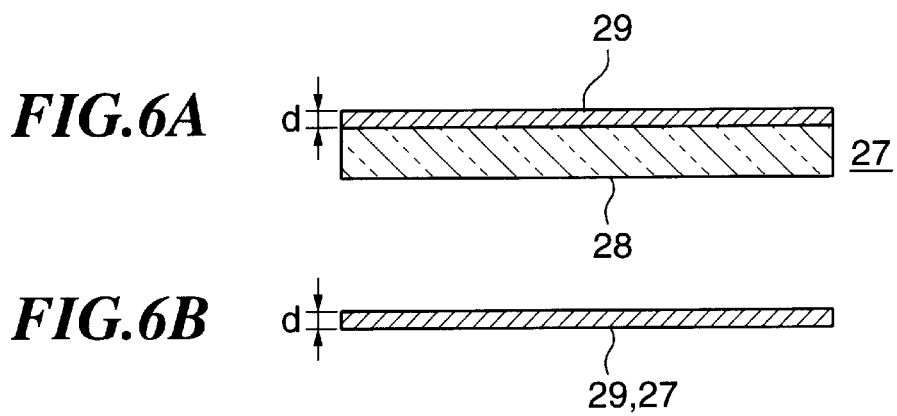
FIG.6A
FIG.6B
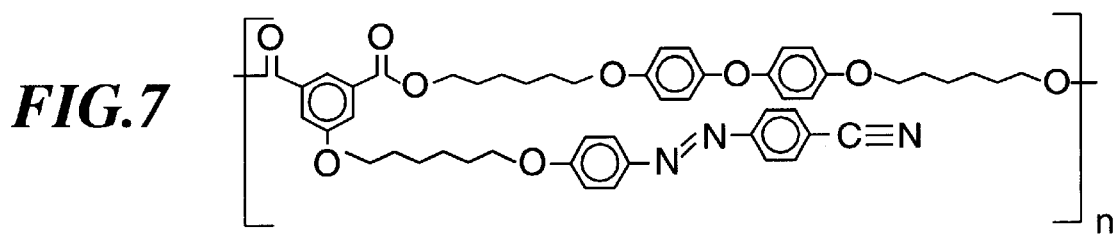
FIG.7
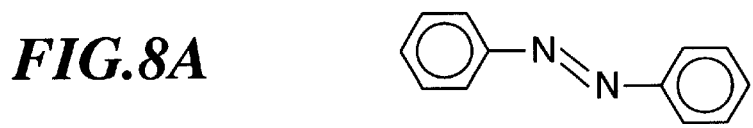
FIG.8A
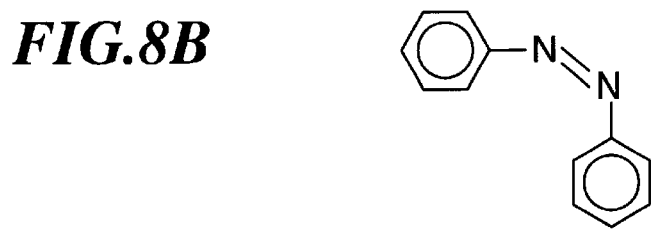
FIG.8B

OPTICAL FILTERING APPARATUS AND METHOD

BACKGROUND OF THE INVENTION

1. Technical Field of the Invention

The present invention relates to an optical filtering apparatus and method which perform optical filtering (spatial frequency filtering).

2. Description of the Prior Art

Optical filtering is a representative parallel optical computing technique. In this case, a Fourier spectrum of an input image is changed by using a spatial frequency filter.

Representative optical filtering techniques are low-pass filtering and high-pass filtering. Generally, low frequency components of an image spectrum correspond to a brief image structure, and edges and fine structure concentrate in a high frequency components. A low-pass filter passes only low frequency components, thus removing noise of high frequency components. A high-pass filter passes only high frequency components for the purpose of extracting image boundaries and enhancing the fine structure. Further, a band-pass filter which passes only a predetermined spatial frequency band is utilized in image compression and image analysis.

Conventionally, in optical filtering, a filter having a two-dimensional transmittance distribution is used as a spatial frequency filter.

FIG. 18 shows an example of the conventional optical filtering method. In this method, input image light 1 is Fourier-transformed by a lens 2. A filter 4 having a two-dimensional transmittance distribution is provided on a Fourier transform surface of the lens 2. A part of Fourier spectrum 3 Fourier transformed of the input image light 1 is passed through the filter 4, and a transmission spectrum 5 is Inverse-Fourier-transformed by a lens 6. Thus output image light 7 is obtained.

In low-pass filtering, the filter 4, as shown as a filter 4L in FIG. 19A, has a central round region corresponding to a low frequency spectrum of the Fourier-transformed image 3 as a light transmitting portion 4a, and the other region corresponding to a high frequency spectrum as a light shield portion 4b. Only the low frequency spectrum of the Fourier-transformed image 3 is passed through the filter 4.

In high-pass filtering, the filter 4, as shown as a filter 4H in FIG. 19B, has a central round region corresponding to a low frequency spectrum of the Fourier-transformed image 3 as a light shield portion 4c, and the other region corresponding to a high frequency spectrum as a light transmitting portion 4d. Only the high frequency spectrum of the Fourier-transformed image 3 is passed through the filter 4.

When the low-pass filtering and the high-pass filtering are simultaneously performed, as shown in FIG. 20, for example, the input image light 1 is divided into two light waves by a half mirror 8. Input image light 1L passed through the half mirror 8 is Fourier-transformed by a lens 2L, and a low frequency spectrum 5L of a Fourier-transformed image 3L passes through the filter 4L. The Fourier-transformed image 3L is Inverse-Fourier-transformed by a lens 6L. Thus the low frequency 7L is obtained. On the other hand, input image light 1H reflected by the half mirror 8 is further reflected by a mirror 9, and Fourier-transformed by a lens 2H. A high frequency spectrum 5H passes through the filter 4H, and Inverse-Fourier-transformed by a lens 6H. Thus the high frequency reconstructed image light 7H is obtained. The original input image can be reconstructed by combining the low frequency reconstructed image light 7L and the high frequency reconstructed image light 7H.

However, since the above-described conventional optical filtering method passes a predetermined frequency component and cuts other frequency components, the cut frequency components are lost on the filter output side. Accordingly, the original input image cannot be reconstructed.

That is, in a case where the filter 4 in FIG. 18 is a low-pass filter as the filter 4L in FIG. 19A, the high frequency spectrum of the Fourier-transformed image 3 is lost on the output side. On the other hand, in a case where the filter 4 is a high-pass filter as the filter 4H in FIG. 19B, the low frequency spectrum is lost on the output side.

Accordingly, in a case where the low-pass filtering and the high-pass filtering are simultaneously performed or in a case where an original input image is reconstructed, it is necessary to provide two filters 4L and 4H, two Fourier transform lenses and Inverse-Fourier transform lenses, and an optical system to divide the input image light 1 into two optical waves, as shown in FIG. 20. This complicates the filtering apparatus and increases the apparatus in size.

SUMMARY OF THE INVENTION

The present invention has been made in view of the above circumstances, and enables selective or simultaneous execution of mutually-complementary low-pass filtering and high-pass filtering and the like, by using a common medium, without losing respective frequency components of Fourier spectrum on the output side, further enables reconstruction of original input image with ease.

According to an aspect of the present invention, the optical filtering apparatus has: a birefringent medium that modulates polarization of a Fourier-transformed image passed therethrough, in accordance with a two-dimensional birefringent distribution, formed in accordance with a spatial frequency distribution of the Fourier-transformed image; and a polarization device provided in an optical path of light passed through the birefringent medium.

Further, according to another aspect of the present invention, the optical filtering method includes the steps of: passing a Fourier-transformed image of an input image through a birefringent medium where a two-dimensional birefringent distribution corresponding to a spatial frequency distribution of the Fourier-transformed image is formed, so as to modulate polarization of the Fourier-transformed image in accordance with the birefringent distribution; and extracting, by a polarization device analyzer, a polarized light component in a desired or predetermined orientation from light passed through the birefringent medium.

In accordance with the present invention as described above, as a filtering medium, a birefringent medium where a two-dimensional birefringent distribution is formed is used in place of a filter having a two-dimensional transmittance distribution. A spatial frequency filter is formed with the birefringent medium and a polarization device analyzer.

As the birefringent medium, an electrically addressed type spatial light modulator, an optical storage medium having an optical storage layer exhibiting photo-induced birefringence on at least one surface side, on which the two-dimensional birefringent distribution is recorded, or the like, can be used. As the polarization device, a analyzer (analyzer), a polarizing beam splitter or the like can be used.

For example, in a case where low-pass filtering and high-pass filtering are selectively or simultaneously performed, in the birefringent medium, the formed birefringent distribution has a central round region corresponding to a low frequency spectrum of Fourier-transformed image in an orientation of 45° to a predetermined orientation (0°), and the other region corresponding to a high frequency spectrum is in the orientation of 0°.

In this arrangement, when the Fourier-transformed image 0° polarized from an input image passes through the birefringent medium, the polarization of the low frequency spectrum is rotated 90°, to an orientation of 90°, while the polarization of the high frequency spectrum is not rotated, still in the orientation of 0°.

Accordingly, if an analyzer is provided in the optical path of light passed through the birefringent medium and the orientation of the analyzer is adjusted to 90°, only 90° polarized component can be extracted through the analyzer. In this manner, the low-pass filtering is performed.

Further, the high-pass filtering is performed by adjusting the orientation of the same analyzer to 0° so as to extract only 0° polarized component of the light passed through the birefringent medium.

Further, if the orientation of the analyzer is adjusted to 45°, the 90° and 0° polarized components passed through the birefringent medium are simultaneously extracted via the analyzer, and the original input image can be reconstructed.

Further, if a polarization beam splitter is provided in the optical path of the light passed through the birefringent medium and the 90° and 0° polarized components of the light passed through the birefringent medium are extracted via the polarization beam splitter, the low-pass filtering and the high-pass filtering can be simultaneously performed. Further, the original input image can be reconstructed by combining the both output light obtained via the polarization beam splitter.

Further, filtering other than the low-pass filtering and the high-pass filtering such as band-pass filtering or band elimination can be performed by changing the two-dimensional birefringent distribution formed in the birefringent medium.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A and 6B are cross-sectional views of an optical storage medium used as the birefringent medium;

FIG. 7 shows a chemical formula of an example of preferable material of an optical storage layer of the optical storage medium;

FIGS. 8A and 8B show a chemical formula of trans form and cis form of azobenzene;

DETAILED DESCRIPTION OF THE PREFERRED EMBODIMENTS

Preferred embodiments of the present invention will now be described in detail in accordance with the accompanying drawings.

Figure 1:
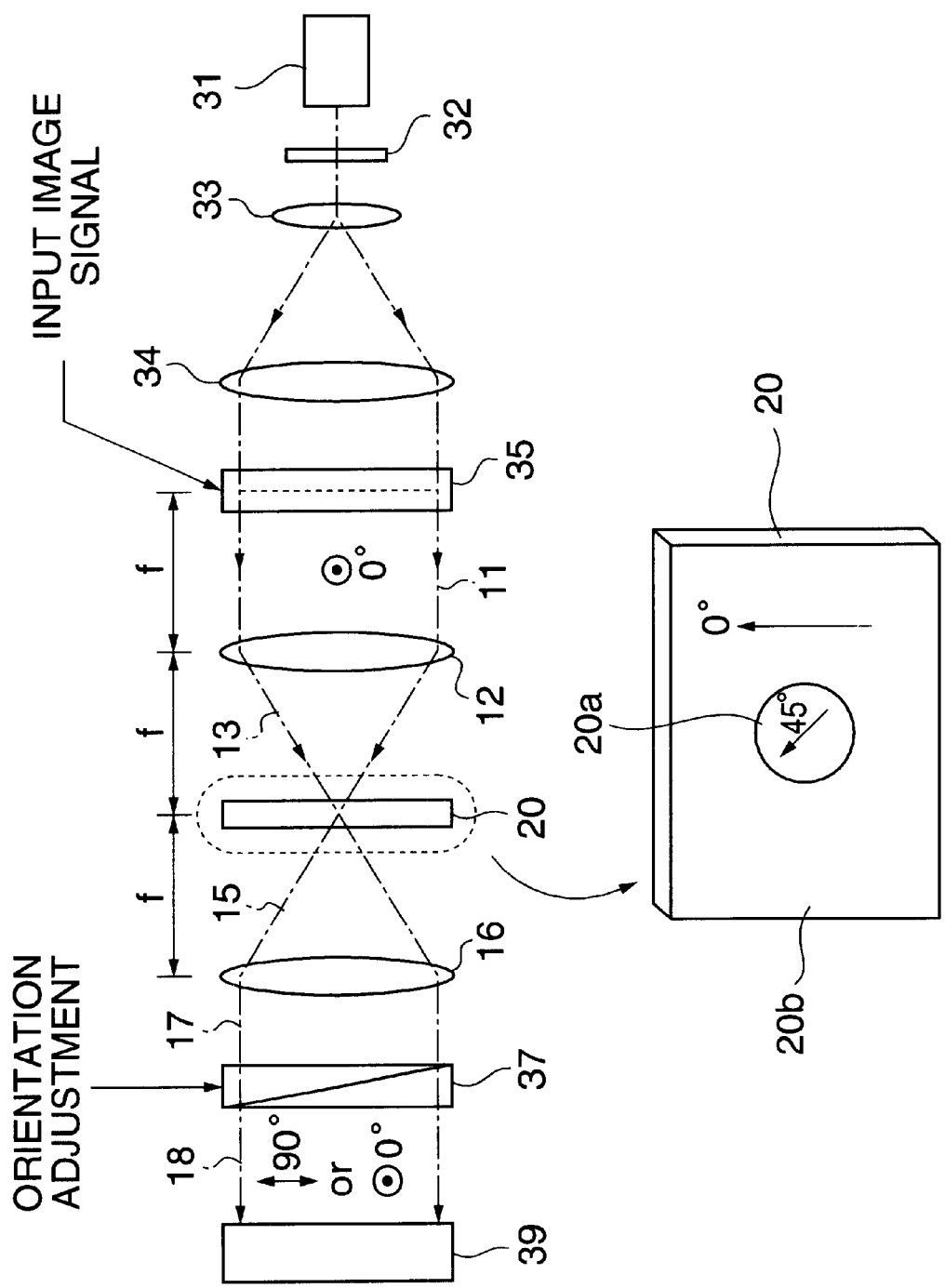
FIG. 1 is a schematic diagram showing filtering apparatus and method according to a first embodiment of the present invention.
Figure 2:
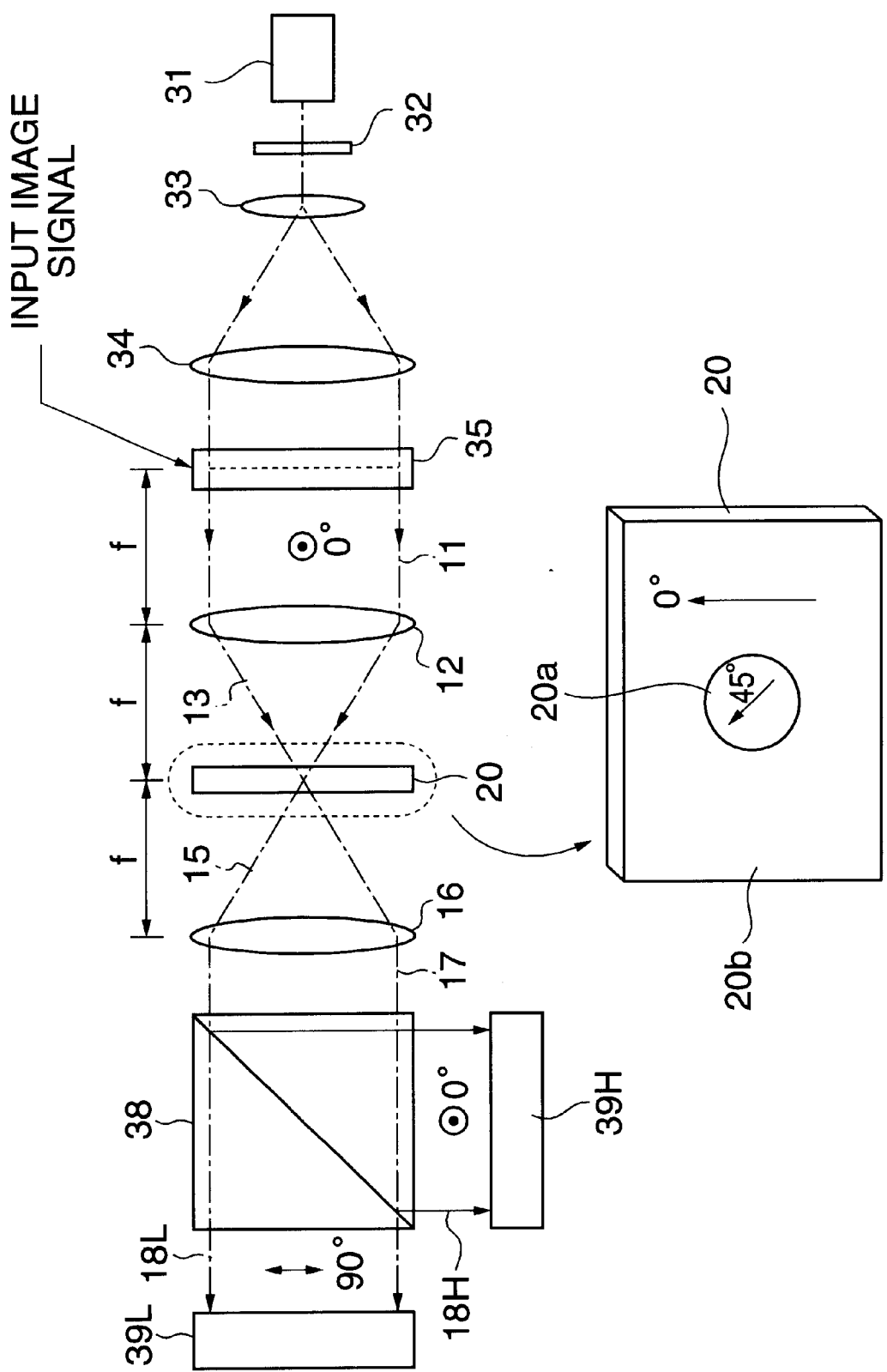
FIG. 2 is a schematic diagram showing the filtering apparatus and method according to a second embodiment of the present invention.

[Construction of Filtering Apparatus and Method . . . FIGS. 1 and 2]

FIG. 1 shows the filtering apparatus and method according to a first embodiment of the present invention.

Light from a light source 31 is passed through a half-wave plate 32 to be linearly-polarized light in a predetermined orientation (0°). The linearly-polarized light is changed by lenses 33 and 34 to wide-diameter collimated light and incident on a spatial light modulator 35. An input image is displayed on the spatial light modulator 35, and the input image light 11 in polarized orientation of 0° is obtained as light passed through the spatial light modulator 35. A transmitting-type liquid crystal panel or the like can be used as the spatial light modulator 35.

The input image light 11 is Fourier-transformed by a lens 12, and a Fourier-transformed image 13 is incident onto a birefringent medium 20 provided on a front focusing surface of the lens 12. Preferably, the spatial light modulator 35 is provided on a rear focusing surface of the lens 12.

In the birefringent medium 20, a two-dimensional birefringent distribution corresponding to a spatial frequency distribution of the Fourier-transformed image 13 is formed, and the polarization of the Fourier-transformed image 13 is modulated in accordance with the birefringent distribution. A particular example of the birefringent medium 20 will be described later.

A Fourier spectrum 15 passed through the birefringent medium 20 is Inverse-Fourier transformed by a lens 16, and the transformed light 17 is incident upon an analyzer 37. Then output light 18 passed through the analyzer 37 is imaged onto a photo detector 39 such as a CCD camera.

The above optical system is a sort of optical system called a "double diffraction optical system" or "re-diffraction optical system" since Fourier transform is performed twice, and further a sort of optical system called a "4f optical system" since the distance between an input image and the lens 12 is equal to a focal distance f of the lenses 12 and 16.

In FIG. 1, in the birefringent medium 20, a birefringent distribution having a central round region 20a corresponding to the low-frequency spectrum of the Fourier-transformed image 13 in an orientation of 45°, and other region 20b corresponding to the high-frequency spectrum 13, in an orientation of 0°, is formed. Thus the filtering apparatus constitutes a low-pass filter and a high-pass filter.

Accordingly, when the Fourier-transformed image 13 passes through the birefringent medium 20, the polarization of the low frequency spectrum 13 is 90° rotated to an orientation of 90°, while the high-frequency spectrum 13 is still in the orientation of 0° without rotation of polarization.

Accordingly, by adjusting the orientation of the analyzer 37 to 90°, the low-frequency spectrum is obtained as output light 18, thus low-pass filtering is performed. Further, by adjusting the orientation of the analyzer 37 to 0°, the high-frequency spectrum is obtained as the output light 18, thus high-pass filtering is performed.

Further, if the orientation of the analyzer 37 is adjusted to 45°, the light intensity is lower in comparison with the case where the orientation of the photo detection element 37 is adjusted to 90° or 0°, however, output images containing the low-frequency spectrum and the high-frequency spectrum are obtained as the output light 18, thus the original input image can be reconstructed.

FIG. 2 shows the filtering apparatus and method according to a second embodiment of the present invention.

In the present embodiment, the analyzer 37 in FIG. 1 is replaced with a polarizing beam splitter 38. Output light 17, Inverse-Fourier transformed by the lens 16 passed through the birefringent medium 20, is divided into output light 18L in a polarized orientation of 90°, passed through the polarization beam splitter 38, and output light 18H in a polarized orientation of 0°, reflected by the polarization beam splitter 38. The output light 18L is imaged onto a photo detector 39L, while the output light 18H is imaged onto a photo detector 39H. The other elements are the same as those of the first embodiment in FIG. 1.

In FIG. 2, in the birefringent medium 20, also formed is a birefringent distribution in which a central round region 20a corresponding to the low-frequency spectrum in an orientation of 45°, and other region 20b corresponding to the high-frequency spectrum, in an orientation of 0°, thus the filtering apparatus constitutes a low-pass filter and a high-pass filter. When the Fourier-transformed image 13 passes through the birefringent medium 20, the polarization of the low frequency spectrum of the Fourier-transformed image 13 is 90° rotated to an orientation of 90°, while the high-frequency spectrum of the Fourier-transformed image 13 is still in an orientation of 0° without rotation of polarization.

Accordingly, as the 90°-polarized orientation output light 18L, the low-frequency spectrum of the Fourier-transformed image 13 is obtained, thus low-pass filtering is performed. At the same time, as the 0°-polarized orientation output light 18H, the high-frequency spectrum of the Fourier-transformed image 13 is obtained, thus high-pass filtering is performed.

Further, although not shown, the original input image can be reconstructed by combining the output light 18L and the output light 18H.

In the embodiments in FIGS. 1 and 2, by changing the two-dimensional birefringent distribution formed in the birefringent medium 20, filtering other than the low-pass filtering and the high-pass filtering such as band-pass filtering, band elimination and the like can be performed.

Further, in the embodiment in FIG. 1 or the embodiment in FIG. 2, the output light 18 or 18L and 18H are imaged onto the photo detector 39 or 39L and 39H, however, the output light 18 or 18L and 18H may be transmitted for the next processing without imaging on the photo detector.

[First Example of Birefringent Medium . . . Electrically Addressed Type Spatial Light Modulator]

As the birefringent medium 20, an electrically addressed type spatial light modulator can be used, and as the spatial light modulator, a transmitting-type liquid crystal panel can be used. Note that in case of a liquid crystal panel for projector, a polarizing plate is provided outside an electrode, however, in case of a liquid crystal panel as the electrically addressed type spatial light modulator used as the birefringent medium 20, the polarizing plate is removed.

Figure 3:
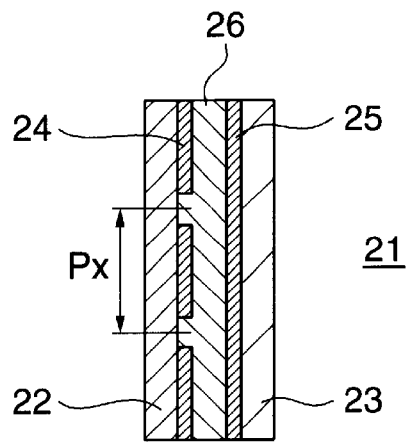
FIG. 3 is a cross-sectional view showing an example of an electrically addressed type spatial light modulator used as a birefringent medium.

FIG. 3 shows an example of the spatial light modulator. In a spatial light modulator 21, transparent electrodes 24 and 25 are formed on inner surfaces of transparent substrates 22 and 23, and liquid crystal is filled as an electro-optic conversion material 26 between the transparent electrodes 24 and 25.

Figure 4A:
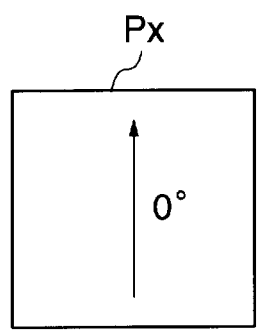
FIGS. 4A and 4B are explanatory views respectively showing a pixel of the spatial light modulator in FIG. 3.
Figure 4B:
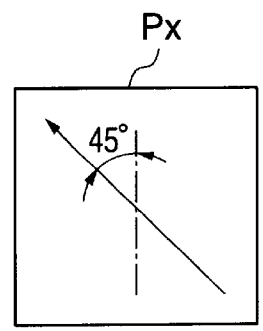

The spatial light modulator 21 functions as a half-wave plate which arbitrarily rotates polarization of incident light per pixel Px. As shown in FIG. 4A, in one pixel, as the orientation of the half-wave plate is parallel to the polarization of the incident light, the polarization of light passing through the pixel is not rotated, on the other hand, as shown in FIG. 4B, in another pixel, as the orientation of the half-wave plate is inclined 45° to the polarization of the incident light, the polarization of the light passing through the pixel is rotated 90°.

Figure 5:
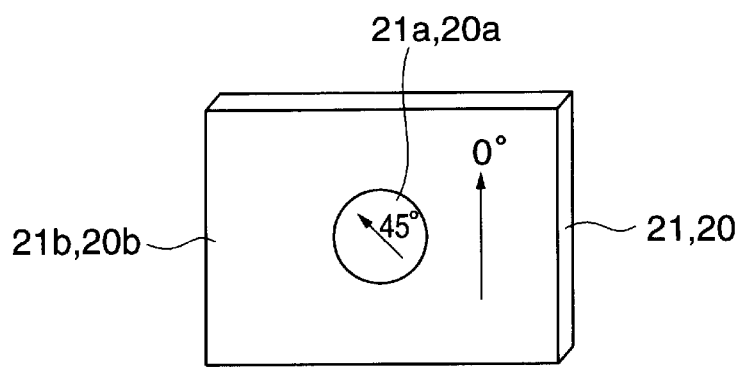
FIG. 5 is a perspective view showing a birefringent distribution formed in the spatial light modulator in FIG. 3.

Accordingly, in accordance with a modulation signal applied to the spatial light modulator 21, as shown in FIG. 5, the birefringent distribution formed in the spatial light modulator 21 can be controlled such that a central round region 21a corresponding to the low frequency spectrum of the Fourier-transformed image 13 in FIG. 1 or 2 is in an orientation of 45°, while the other region 21b corresponding to the high frequency spectrum is in an orientation of 0°. When the Fourier-transformed image 13 passes through the spatial light modulator 21, the polarization of the Fourier-transformed image 13 is modulated such that the polarization of the low frequency spectrum is 90° rotated to the orientation of 90°, while the polarization of the high frequency spectrum is not rotated and still in the orientation of 0°.

Accordingly, as in the embodiment shown in FIG. 1 or the embodiment in FIG. 2, low-pass filtering and high-pass filtering can be performed, and an original input image can be reconstructed.

Further, in the case where the electrically addressed type spatial light modulator 21 is used as the birefringent medium 20, the birefringent distribution formed in the birefringent medium 20 can be easily changed in accordance with the modulation signal applied to the spatial light modulator 21, and the spatial frequency characteristic of the filtering can be easily changed.

[Second Example of Birefringent Medium . . . Optical Storage Medium as Optical-Address Type Spatial Light Modulator]

Under the present circumstances, in the electrically addressed type spatial light modulator 21, it is difficult to set the size of each pixel Px to be equal to or less than several 10 μm×several 10 μm, which is insufficient to modulate the polarization of the Fourier-transformed image 13 with high resolution. If the focal distance f of the lens 12 for Fourier transform is lengthened, the obtained Fourier-transformed image 13 can be enlarged, and the resolution of the spatial light modulator 21 can be equivalently increased. However, the optical system of the filtering apparatus is increased in size.

Accordingly, a high-resolution spatial light modulator is desired as the birefringent medium 20. As this spatial light modulator, an optical-address type spatial light modulator without electrode structure is preferable. The following optical storage medium can be used as the spatial light modulator.

In the optical storage medium, as shown in FIG. 6A, an optical storage layer 29 is formed on one surface side of a transparent substrate 28 such as a glass substrate, or as shown in FIG. 6B, only the optical storage layer 29 constitutes the medium. Note that as the optical storage layer 29, a material which exhibits photo-induced birefringence and record-holds the birefringence is used.

Any material can be used as the optical storage medium as long as it exhibits photo-induced birefringence and record-holds the birefringence. For example, polymer or polymeric liquid crystal having a photoisomerizable group in its side chain can be used as preferable material. As the photoisomerizable group, an azo group is preferable. One of the most desirable materials is polyester having cyanoazobenzene units in the side chain as expressed by a chemical formula in FIG. 7.

Figure 9A:
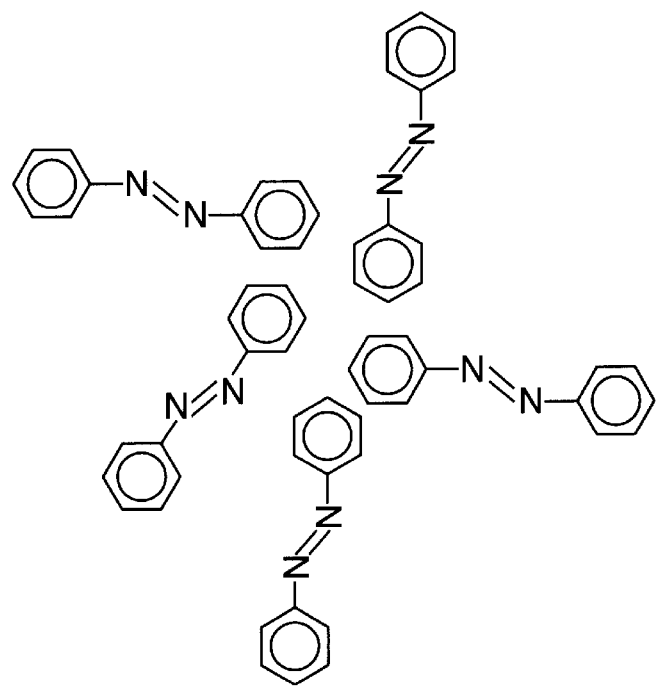
FIGS. 9A and 9B are explanatory views showing photo-induced birefringence of azobenzene.

Azobenzene exhibits trans-cis photoisomerization upon light irradiation. When it becomes a trans form isomer, the molecular structure becomes as expressed by a chemical formula in FIG. 8A, and when it becomes a cis form isomer, the molecular structure becomes as expressed by a chemical formula in FIG. 8B. Further, azobenzene as a monomer exhibits anisotropy, however, when it exists in a side chain of polymer or polymeric liquid crystal, it is arrayed at random as shown in FIG. 9A, and exhibits isotropy as a whole.

Further, for the above photoisomerization, a large number of trans-form isomers exist prior to optical pumping, then the trans form isomers change to the cis form isomers by the optical pumping, and a large number of cis-form isomers exist after the optical pumping.

Figure 9B:
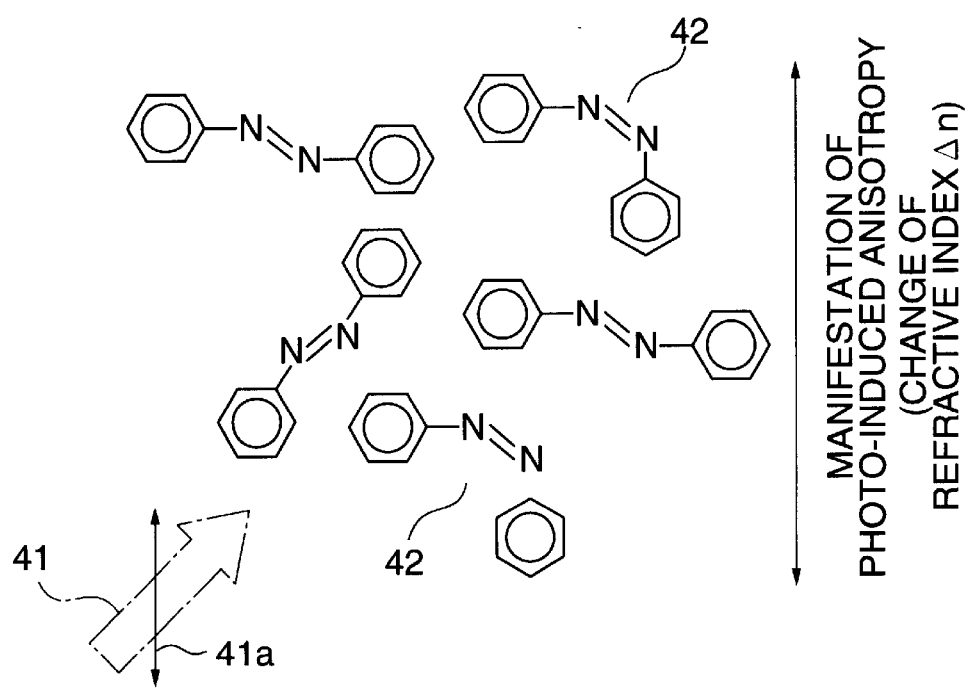

Especially, as shown in FIG. 9B, when pump light 41 having liner polarization in a polarization direction 41a is emitted on an optical storage layer having a polymer or polymeric liquid crystal having azobenzene units in the side chain, only azobenzene 42 in the same direction as the polarization direction 41a absorbs the pump light 41 and becomes the cis form isomer. At this time, the birefringence of the azobenzene itself caused by isomerization of the azobenzene and the birefringence of the polymer or polymeric liquid crystal induced by the isomerization of the azobenzene are combined, and birefringence with the polarization direction 41a of the pump light 41 as an axis is caused in the optical storage layer. The optical storage layer can function as the polarization-modulatable optical-address type spatial light modulator by utilizing the photo-induced birefringence.

Figure 10:
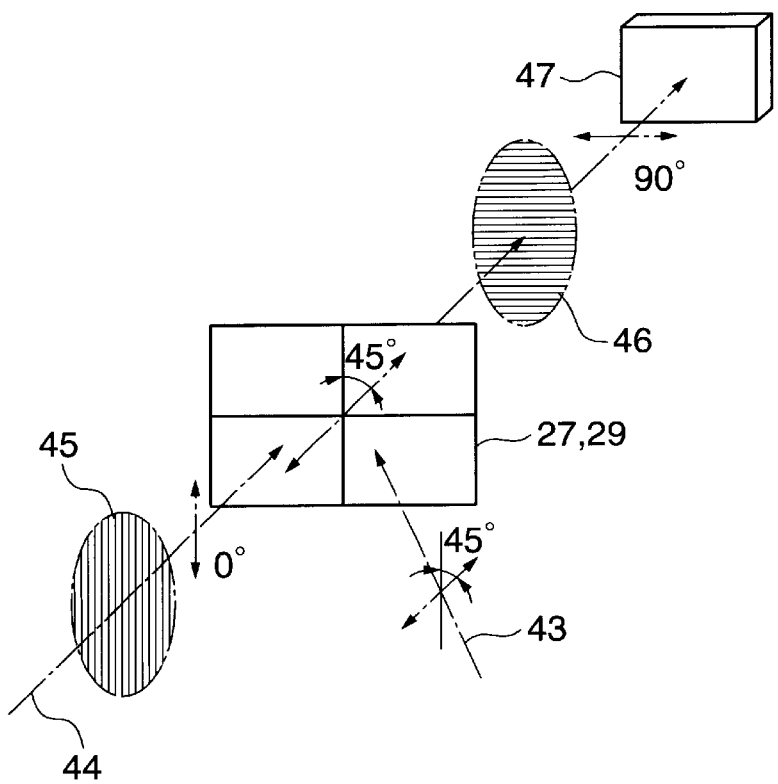
FIG. 10 is an explanatory view of an optical system used in measurement.

The inventor has found that polyester having cyanoazobenzene units in the side chain exhibits photo-induced birefringence and the birefringence can be recorded, by using an optical system as shown in FIG. 10.

An optical storage medium 27 has an optical storage layer 29 of polyester having cyanoazobenzene units in the side chain. As pump light 43 to induce birefringence in the optical storage layer 29, an argon-ion laser-oscillated beam about 515 nm, to which polyester having cyanoazobenzene units in the side chain has sensitivity, is used. As probe light 44 for measurement of birefringence, a helium-neon laser-oscillated beam about 633 nm, to which polyester having cyanoazobenzene units in the side chain has no sensitivity, is used.

The optical storage medium 27 is placed in the optical path of the probe light 44, a polarization element 45 and an analyzer 46 are provided in front and rear of the optical storage medium 27, and a photo detector 47 is provided in rear of the analyzer 46. The orientation of the polarizer 45 is set to the basic orientation of 0°, and the orientation of the analyzer 46 is set to 90°. In this condition, if the optical storage layer 29 has no anisotropy, the polarization direction of the probe light 44 is not changed by the optical storage layer 29, and the probe light 44 cannot pass through the analyzer 46.

The polarization direction of the pump light 43 is set to 45° which is an intermediate orientation between that of the polarizer 45 and that of the analyzer 46, then the pump light 43 is emitted on the photo recording medium 27, to induce birefringence in the optical storage layer 29. The intensity of the pump light 43 is about 5 W/cm². At this time, in the probe light 44, the polarization is rotated by the induced birefringence in the optical storage layer 29. The probe light 44 passes through the analyzer 46.

Let Io be the intensity of the probe light 44, λ, be the wavelength of the probe light 44, Δn, be the change of refractive index by induced birefringence in the optical storage layer 29, and d, be the thickness of the optical storage layer 29 as shown in FIG. 6, then the intensity I of the light passed through the analyzer 46 is expressed as:

$$I = Io \times \sin^2(\pi \times \Delta n \times d / \lambda) \quad (1)$$

Figure 11:
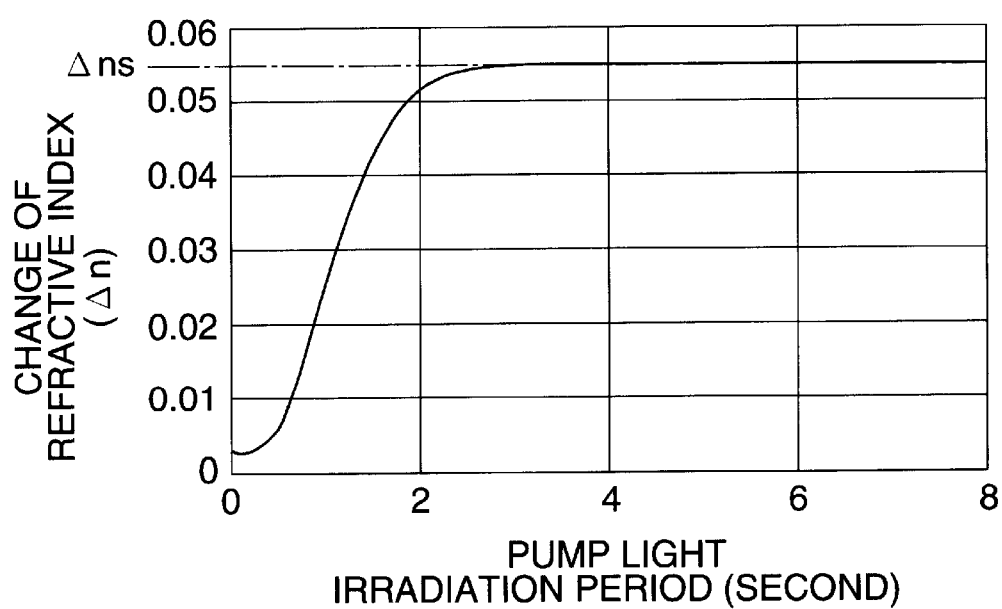
FIG. 11 is a line graph showing a change of refractive index calculated from the result of the measurement.

FIG. 11 shows the change of refractive index Δn, obtained by substituting the intensity ratio I/Io as the result of measurement when λ=633 nm and d=2 μm hold into the expression (1). In FIG. 11, the lateral axis represents irradiation period of the pump light 43, and the vertical axis, the obtained change of refractive index Δn.

It is understood from the graph that the change of refractive index Δn, by the birefringence in the optical storage layer 29 induced by the irradiation of pump light 43, increases with the irradiation period of the pump light 43, and becomes saturated when the irradiation period is a predetermined period or longer. The saturated change of refractive index Δns is about 0.055.

It has been confirmed that if the optical storage medium 27 in which birefringence is induced in the optical storage layer 29 is held at room temperature, the change of refractive index Δn is constantly maintained for several weeks even under natural light.

In this manner, as polyester having cyanoazobenzene units in the side chain represents photo-induced birefringence and record-holds the birefringence, it is preferable to be used in the optical-address type spatial light modulator as the birefringent medium 20 in FIG. 1 or 2.

In the optical storage medium 27, having the optical storage layer 29 which exhibits photo-induced birefringence, a two-dimensional birefringent distribution is recorded on the optical storage layer 29 by irradiating the optical storage layer 29 with recording light (pump light) having a spatial polarization distribution. Thus the optical storage medium 27 is used as the birefringent medium 20 as shown in FIG. 1 or 2.

In this case, when the product between the photo induced birefringence Δn in the optical storage layer 29 irradiation and the thickness d of the optical storage layer 29, Δn×d is equal to (m+1/2)λ (note that m is "0" or positive integer), in the expression (1), $$\sin^2(\pi \times \Delta n \times d/\lambda) = \sin^2\{(m+1/2)\pi\} = 1 \quad (2)$$

As the optical storage medium 27 can efficiently rotate the orientation of linearly-polarized light which passes through the medium, the thickness d of the optical storage layer 29 is adjusted to a value satisfying the following expression $$\Delta n \times d = (m+1/2)\lambda \quad (3)$$

λ is a wavelength of the Fourier-transformed image 13 in FIG. 1 or 2.

If the thickness d of the optical storage layer 29 does not satisfy the relation of the expression (3), as the Fourier spectrum 15 passed through the optical storage medium 27 as the birefringent medium 20 becomes elliptic polarized light, there is a possibility that filtering with a desired spatial frequency characteristic cannot be performed.

In a case where polyester having cyanoazobenzene units in the side chain is used as the optical storage layer 29, when λ=633 nm holds, as Δns =0.055 holds as shown in FIG. 11, this is substituted as the change of refractive index Δn into the expression (3) such that m=0 holds. Thus d=5.75 μm holds.

The optical storage layer 29 of the optical storage medium 27 is formed with polyester having cyanoazobenzene units in the side chain having a thickness of about 5.75 μm, then the pump light 43 is emitted on the optical storage medium 27 by the optical system as shown in FIG. 10, to induce birefringence in the optical storage layer 29. Further, before or after the irradiation of the pump light 43, the probe light 44 is passed through the polarizer 45 and emitted on the optical storage medium 27, then the analyzer 46 is rotated, and the intensity of the light passed through the analyzer 46 is measured by the photo detector 47.

Figure 12:
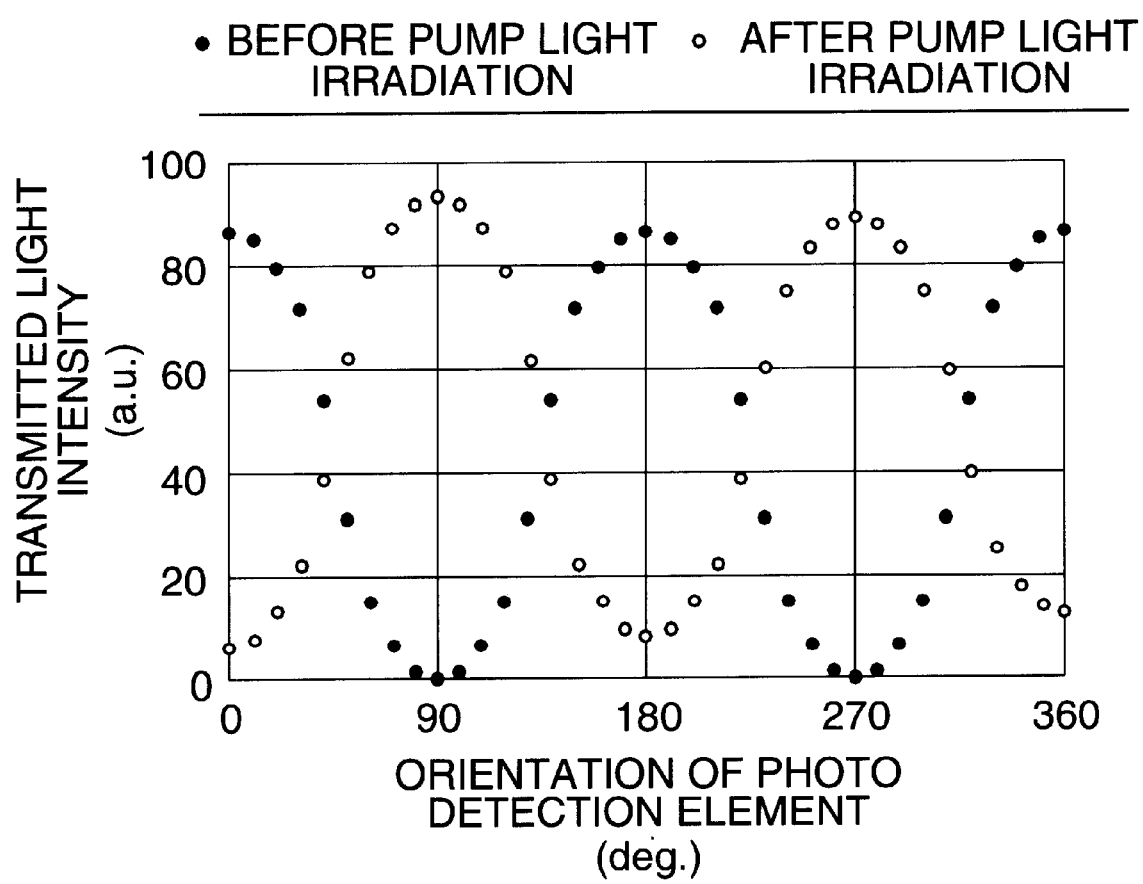
FIG. 12 is a graph showing transmitted light intensity of the result of the measurement to orientation of the analyzer.

FIG. 12 shows the results of measurement. The lateral axis represents the orientation of the analyzer 46, and the vertical axis, the intensity of light passed through the analyzer 46. A black dot represents the intensity of transmitted light before the irradiation of the pump light 43, and a blank dot, the intensity of transmitted light after the irradiation of the pump light 43.

As it is apparent from FIG. 12, before the irradiation of the pump light 43, when the orientation of the analyzer 46 is 0° or 180°, the intensity of transmitted light is the maximum, while when the orientation of the analyzer 46 is 90° or 270°, the intensity of transmitted light is the minimum. On the other hand, after the irradiation of the pump light 43, when the orientation of the analyzer 46 is 90° or 270°, the intensity of transmitted light is the maximum, while when the orientation of the analyzer 46 is 0° or 180°, the intensity of transmitted light is the minimum. This means that the irradiation of the pump light 43 induces the function of half-wave plate in the optical storage layer 29, and the optical storage layer 29 rotates the polarization of light that passes through the optical storage medium 27 90°.

Figure 13:
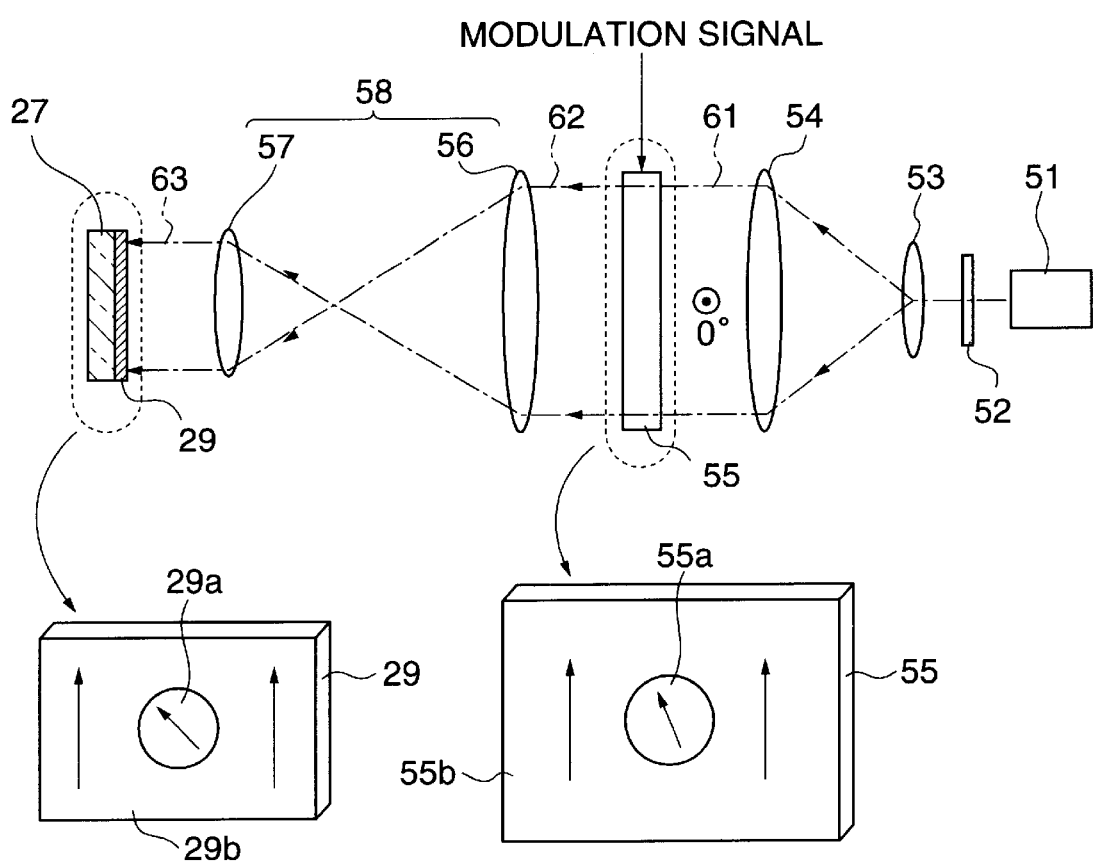
FIG. 13 is an explanatory view showing an example of the method for forming the birefringent medium by recording the birefringent distribution on the optical storage layer of the optical storage medium.

In the optical storage medium 27, a two-dimensional birefringent distribution is recorded on the optical storage layer 29 by a method as shown in FIG. 13, and the optical storage medium 27 is used as the birefringent medium 20 in FIG. 1 or 2.

As a light source 51 for recording, a device to emit light to which the optical storage layer 29 has sensitivity is used. In a case where the optical storage layer 29 is formed with polyester having cyanoazobenzene units in the side chain, the above-described argon-ion laser-oscillated beam about 515 nm, for example, is used.

Light from the light source 51 is passed through a half-wave plate 52, as linearly-polarized light in a predetermined orientation (the orientation is set as 0°), then the linearly-polarized light is changed by lenses 53 and 54 to wide-diameter collimated light 61, and incident upon a spatial light modulator 55.

The spatial light modulator 55 is an electrically addressed type spatial light modulator similar to the spatial light modulator 21 as shown in FIG. 3. Accordingly, the spatial light modulator 55 functions as a half-wave plate which can arbitrarily rotate the polarization of the incident light 61 by each pixel.

In a case where a birefringent distribution for low-pass filtering and high-pass filtering is recorded on the optical storage layer 29, the birefringent distribution formed in the spatial light modulator 55 is controlled by a modulation signal applied to the spatial light modulator 55, such that a central round region 55*a* of the spatial light modulator 55 is in an orientation of 22.5°, and the other region 55*b* is in an orientation of 0° as shown in FIG. 13. When the incident light 61 passes through the spatial light modulator 55, the polarization of the incident light 61 is modulated such that the polarization of the center round portion of the incident light 61 is rotated to an orientation of 45°, while the polarization of the other portion of the incident light 61 is not rotated and still in the orientation of 0°.

A light wave 62 passed through the spatial light modulator 55, having a central round portion in the polarization orientation of 45° and the other portion in the polarization orientation of 0° is reduced by a reduction optical system 58 having lenses 56 and 57, and a reduced light wave 63 is irradiated as recording light on the optical storage layer 29.

By this arrangement, a birefringent distribution similar to the birefringent distribution in FIG. 5 formed in the spatial light modulator 21 in FIG. 3, in which a central round region 29*a* corresponding to the low frequency spectrum of the Fourier-transformed image 13 in FIG. 1 or 2 is in an orientation of 45°, while the other region 29*b* corresponding to the high frequency spectrum is in an orientation of 0°, is recorded on the optical storage layer 29. The irradiation period of the light wave 63 on the optical storage layer 29 is equal to or longer than a period from which the change of refractive index Δn is saturated.

As described above, it is desirable that the thickness d of the optical storage layer 29 is adjusted to a value which satisfies the relation of the expression (3).

In a case where the electrically addressed type spatial light modulator 21 in FIG. 3 is used as the birefringent medium 20 in FIG. 1 or 2, the birefringent distribution formed in the birefringent medium 20 can be easily changed by the modulation signal applied to the spatial light modulator 21, thus the spatial frequency characteristic of filtering can be easily changed. However, it is difficult to modulate the polarization of the Fourier-transformed image 13 with high resolution without increasing the optical system of the filtering apparatus in size.

On the other hand, in a case where the optical storage medium 27 in which a birefringent distribution is recorded on the optical storage layer 29 by the method in FIG. 13 is used as the birefringent medium 20, to change the spatial frequency characteristic of filtering, rewrite to the optical storage medium 27 must be performed or another optical storage medium must be prepared. However, even though each pixel size of the electrically addressed type spatial light modulator 55 is larger than several 10 μm×several 10 μm, the reduction optical system 58 can reduce the pixel size of the optical storage medium 27 as the optical-address type spatial light modulator to several 10 μm×several 10 μm or smaller. Thus a high-resolution birefringent medium can be realized.

[Example of Filtering Experiment]

The optical storage medium 27 in which a birefringent distribution is recorded by the method in FIG. 13 on the optical storage layer 29 is used as the birefringent medium 20 in FIG. 2, and the low-pass filtering and the high-pass filtering are simultaneously performed by the method in FIG. 2.

As the optical storage layer 29, polyester having cyanoazobenzene units in the side chain is used. The thickness d of the optical storage layer is about 5.75 μm. As the light source 51 in FIG. 13, an argon-ion laser-oscillated beam about 515 nm is used. The light intensity is about 5 W/cm$^2$.

As the electrically addressed type spatial light modulator 55, a 1.3 type liquid crystal panel for projector, having about 640×480 pixels each having a size of about 42 μm×42 μm, is employed. Note that in the panel, a polarizing plate is removed. In the spatial light modulator 55, the birefringent distribution shown in FIG. 3 is formed. The optical storage layer 29 is exposed for about four seconds.

The optical storage medium 27 in which the birefringent distribution is recorded on the optical storage layer 29 as above, is used as the birefringent medium 20 in FIG. 2. As the light source 31 in FIG. 2, a helium-neon laser-oscillated beam about 633 nm is used. As the spatial light modulator 35, a 1.3 type liquid crystal panel for projector, having about 640×480 pixels each having a size of about 42 μm×42 μm, is employed.

Figure 14A:
FIGS. 14A to 14F show examples of respective images and respective spectra in a filtering experiment.
Figure 14B:
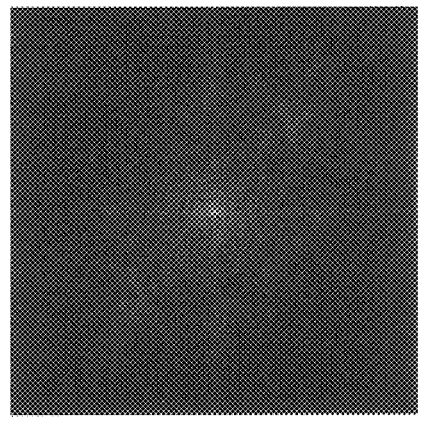
Figure 14C:
Figure 14D:
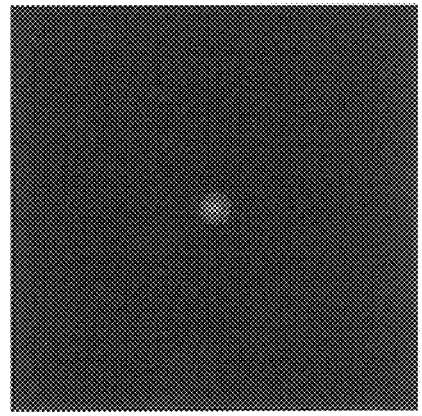
Figure 14E:
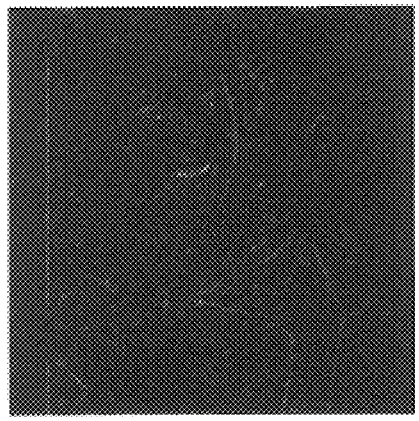
Figure 14F:
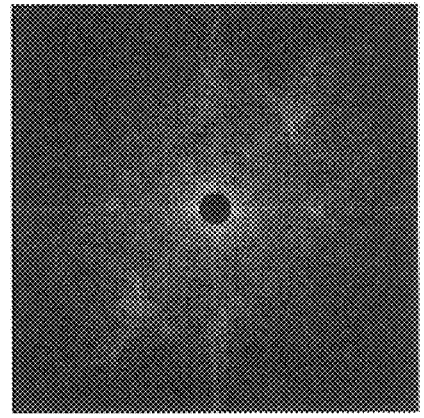

When an image as shown in FIG. 14A is displayed as an input image on the spatial light modulator 35, as the output light 18L in a polarization orientation of 90° passed through the polarizing beam splitter 38, a low frequency reconstructed image as shown in FIG. 14C is obtained, and as the output light 18H in the polarization orientation of 0° reflected by the polarization beam splitter 38, a high frequency reconstructed image as shown in FIG. 14E is obtained. The Fourier spectrum of the input image is as shown in FIG. 14B. The low frequency spectrum is as shown in FIG. 14D, and the high frequency spectrum is as shown in FIG. 14F.

[Other Embodiments]

Figure 15:
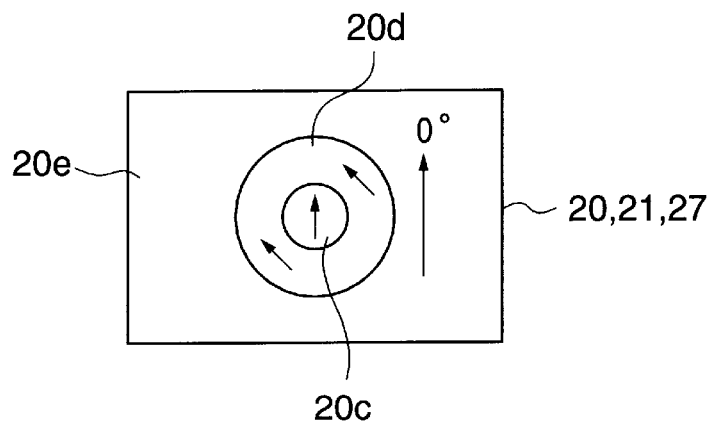
FIG. 15 is an explanatory view showing another example of the birefringent distribution formed in the birefringent medium.
Figure 16A:
FIGS. 16A and 16B are graphs showing filtering characteristics in the birefringent distribution in FIG. 15.
Figure 16B:
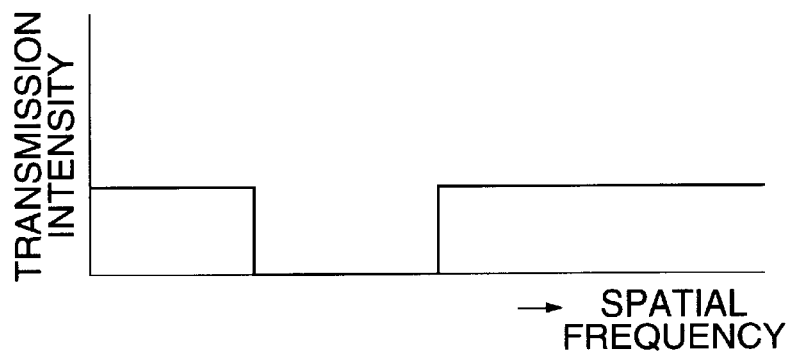

As shown in FIG. 15, by controlling the birefringent distribution formed in the birefringent medium 20 (spatial light modulator 21 or optical storage medium 27) such that a central circular region 20d of the birefringent medium 20 is in the orientation of 45°, a region 20c and a region 20e, inside and outside the circular region, are in the orientation of 0°, filtering having a band-pass filter characteristic as shown in FIG. 16A and filtering having a band-eliminator characteristic as shown in FIG. 16B can be performed, selectively in the first embodiment in FIG. 1, or simultaneously in the second embodiment in FIG. 2.

Figure 17:
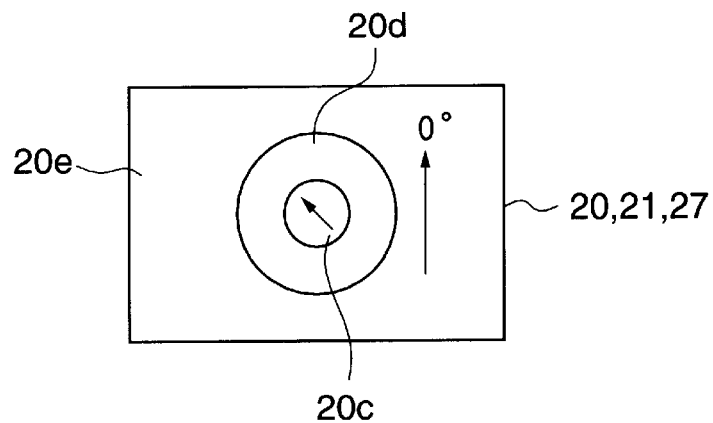
FIG. 17 is an explanatory view showing another example of the birefringent distribution formed in the birefringent medium.

Further, as shown in FIG. 17, by controlling the birefringent distribution formed in the birefringent medium 20 (spatial light modulator 21 or optical storage medium 27) such that the central circular region 20d of the birefringent medium 20 is in an orientation of continuously changing from 45° to 0° from the inside toward the outside, and the region 20c inside the region 20d is in the orientation of 45° and the region 20e outside the circular region 20d, in the orientation of 0°, filtering of differential filter where a spatial frequency characteristic is represented by a linear function can be performed. Further, although not shown in the figure, it can be arranged such that filtering of Laplacian filter represented by a quadratic function can be performed.

Figure 18:
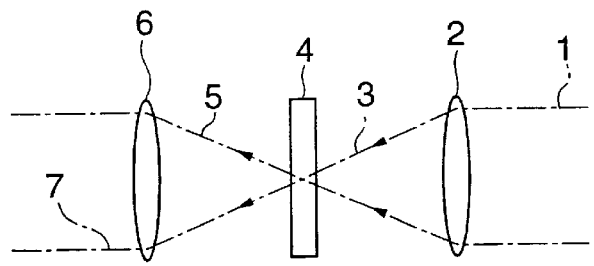
FIG. 18 is a schematic diagram showing an example of the conventional optical filtering method.
Figure 19A:
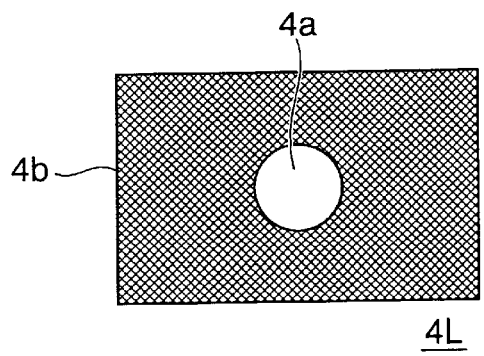
FIGS. 19A and 19B respectively show an example of transmittance distribution of the filter in FIG. 18.
Figure 19B:
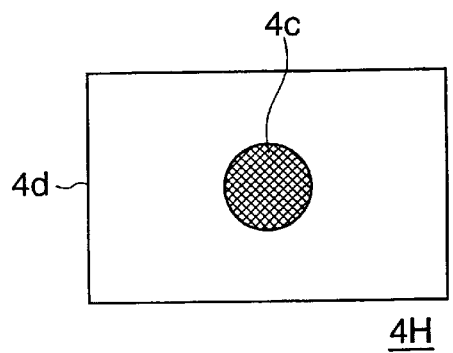
Figure 20:
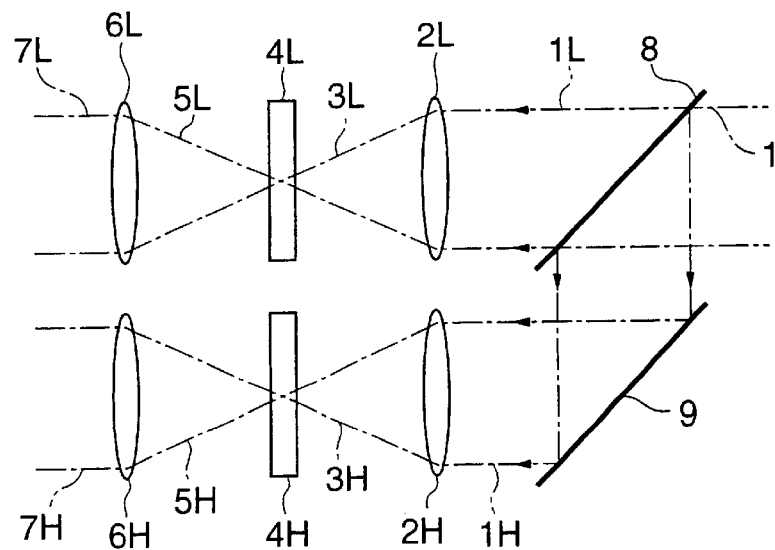
FIG. 20 is a schematic diagram showing another example of the conventional optical filtering method.

Note that the use of filter 4 having a two-dimensional transmission distribution as shown in FIG. 18 as the differential filter or Laplacian filter is described in a document "S. H. Lee: Opt. Eng., 13, 196 (1974)". In this method, as described above, as a cut frequency component is lost on the output side of the filter 4, an output image of another frequency cannot be obtained, and an original input image cannot be reconstructed.

The birefringent medium 20 is not limited to the electrically addressed type spatial light modulator 21 and the optical storage medium 27 in which a birefringent distribution is recorded on the optical storage layer 29. For example, if filtering of low-pass filter and filtering of high-pass filter, or filtering of band-pass filter and filtering of band-eliminator filter are performed, a transparent substrate can be employed. In this case, a half-wave plate in an orientation of 45° is attached to a portion corresponding to the round region 20a in FIG. 1 or 2 or the circular region 20d in FIG. 15.

As described above, according to the present invention, by using a common filtering medium, mutually-complementary low-pass filtering and high-pass filtering and the like can be selectively or simultaneously performed without losing respective frequency components of a Fourier spectrum on the output side of the medium, and an original input image can be easily reconstructed.

The present invention is not limited to the above embodiments and various changes and modifications can be made within the spirit and scope of the present invention. Therefore, to appraise the public of the scope of the present invention, the following claims are made.

What is claimed is:

1. An optical filtering apparatus comprising:

a birefringent medium that modulates polarization of a Fourier-transformed image, which passes therethrough, in accordance with a two-dimensional birefringent distribution formed in accordance with a spatial frequency distribution of the Fourier-transformed image; and a polarization device provided in an optical path of light passed through the birefringent medium, wherein the polarization device includes a polarizing beam splitter, and wherein output images having mutually-complementary spatial frequency characteristics can be simultaneously obtained from the polarizing beam splitter;

wherein the birefringent medium is an electrically addressed type spatial light modulator.

2. An optical filtering apparatus comprising:

a birefringent medium that modulates polarization of a Fourier-transformed image, which passes therethrough, in accordance with a two-dimensional birefringent distribution formed in accordance with a spatial frequency distribution of the Fourier-transformed image; and a polarization device provided in an optical path of light passed through the birefringent medium, wherein the birefringent medium has an optical storage layer exhibiting photo-induced birefringence on at least one surface side, and wherein the two-dimensional birefringent distribution, corresponding to the spatial frequency distribution of the Fourier-transformed image passed through the birefringent medium, is recorded on the optical storage layer;

wherein a thickness d of the optical storage layer satisfies the expression:

$$\Delta n \times d = (m + \tfrac{1}{2})\lambda$$

wherein $\Delta n$ is a change of a refractive index of the optical storage layer by birefringence induced in the optical storage layer, $\lambda$, a wavelength of the Fourier-transformed image, and m, a value "0" or a positive integer.

3. The optical filter apparatus according to claim 2, wherein the optical storage layer comprises a polymer or polymeric liquid crystal having a photoisomerizable group in a side chain.

4. The optical filtering apparatus according to claim 3, wherein the photoisomerizable group is an azo group.

5. The optical filtering apparatus according to claim 2, wherein the polarization device includes a polarizer, and wherein an output image having a desired spatial frequency characteristic can be obtained by adjusting an orientation of the polarizer.

6. An optical filtering method comprising the steps of:
passing a Fourier-transformed image of an input image through a birefringent medium where a two-dimensional birefringent distribution corresponding to a spatial frequency distribution of the Fourier-transformed image is formed;
modulating polarization of the Fourier-transformed image in accordance with the birefringent distribution; and
extracting, by a polarizing beam splitter, a polarization component in a desired or predetermined orientation from light passed through the birefringent medium;
wherein an electrically addressed type spatial light modulator is used as the birefiingent medium.

7. An optical filtering method comprising the steps of:
passing a Fourier-transformed image of an input image through a birefringent medium where a two-dimensional birefringent distribution corresponding to a spatial frequency distribution of the Fourier-transformed image is formed;
modulating polarization of the Fourier-transformed image in accordance with the birefringent distribution; and
extracting, by a polarizing beam splitter, a polarization component in a desired or predetermined orientation from light passed through the birefringent medium, wherein an optical storage medium is used as the birefringent medium, and wherein the optical storage medium has an optical storage layer exhibiting photo-induced birefringence on at least one surface side, in which the two-dimensional birefringent distribution corresponding to the spatial frequency distribution of the Fourier-transformed image passing through the optical storage medium is recorded;
wherein in the optical storage medium, a thickness d of the optical storage layer satisfies the expression:

$$\Delta n \times d = (m + \tfrac{1}{2})\lambda$$

wherein $\Delta n$ is a change of a refractive index of the optical storage layer by birefringence induced in the optical storage layer, $\lambda$, a wavelength of the Fourier-transformed image, and m, a value "0" or a positive integer.

8. An optical filtering method comprising the steps of:
passing a Fourier-transformed image of an input image through a birefringent medium where a two-dimensional birefringent distribution corresponding to a spatial frequency distribution of the Fourier-transformed image is formed;
modulating polarization of the Fourier-transformed image in accordance with the birefringent distribution; and
extracting, by a polarizing beam splitter, a polarization component in a desired or predetermined orientation from light passed through the birefringent medium, wherein an optical storage medium is used as the birefringent medium, and wherein the optical storage medium has an optical storage layer exhibiting photo-induced birefringence on at least one surface side, in which the two-dimensional birefringent distribution corresponding to the spatial frequency distribution of the Fourier-transformed image passing through the optical storage medium is recorded;
wherein the polarizing beam splitter includes a polarizer, and wherein an output image having a desired spatial frequency characteristic is obtained by adjusting an orientation of the polarizer.

9. An optical filtering method comprising the steps of:
passing a Fourier-transformed image of an input image through a birefringent medium where a two-dimensional birefringent distribution corresponding to a spatial frequency distribution of the Fourier-transformed image is formed;
modulating polarization of the Fourier-transformed image in accordance with the birefringent distribution; and
extracting, by a polarizing beam splitter, a polarization component in a desired or predetermined orientation from light passed through the birefringent medium; wherein output images having mutually-complementary spatial frequency characteristics are simultaneously obtained from the polarizing beam splitter.

10. The optical filtering method according to claim 9, wherein the output images include an output image having spatial frequencies that are between a low-band and a high-band spectra of spatial frequencies.

11. An optical storage medium having an optical storage layer exhibiting a photo-induced birefringence on at least one surface side, wherein a two-dimensional birefringent distribution corresponding to a spatial frequency distribution of a Fourier-transformed image passing through the optical storage medium is recorded on the optical storage layer;

wherein a thickness d of the optical storage layer satisfies the expression:

$$\Delta n \times d = (m + \tfrac{1}{2})\lambda$$

wherein $\Delta n$ is a change of a refractive index of the optical storage layer by birefringence induced in the optical point storage layer, $\lambda$, a wavelength of the Fourier-transformed image, and m, a value "0" or a positive integer.

12. The optical storage medium according to claim 11, wherein the optical storage layer comprises a polymer or polymeric liquid crystal having a photoisomerizable group in a side chain.

13. The optical storage medium according to claim 12, wherein the photoisomerizable group is an azo group.

14. A method for recording a two-dimensional birefringent distribution on an optical storage layer on an optical storage medium, the two-dimensional birefringent distribution corresponding to a spatial frequency distribution of a Fourier-transformed image passing through an optical storage medium, comprising the steps of:

passing linearly-polarized recording light through a spatial light modulator in which the two-dimensional birefringent distribution is formed;

modulating polarization of the recording light in accordance with the birefringent distribution;

reducing the recording light after modulation by a reduction optical system; and irradiating the optical storage layer exhibiting a photo-induced birefringence on at least one surface side of the optical storage medium with the recording light.

15. An optical filtering apparatus comprising:

a birefringent medium that modulates polarization of a Fourier-transformed image, which passes therethrough, in accordance with a two-dimensional birefringent distribution formed in accordance with a spatial frequency distribution of the Fourier-transformed image; and a polarization device provided in an optical path of light passed through the birefringent medium, wherein the polarization device includes a polarizing beam splitter, and wherein output images having mutually-complementary spatial frequency characteristics can be simultaneously obtained from the polarizing beam splitter;

wherein the output images include an output image having spatial frequencies that are between a low-band and a high-band spectra of spatial frequencies.

* * * * *